Figure 1:
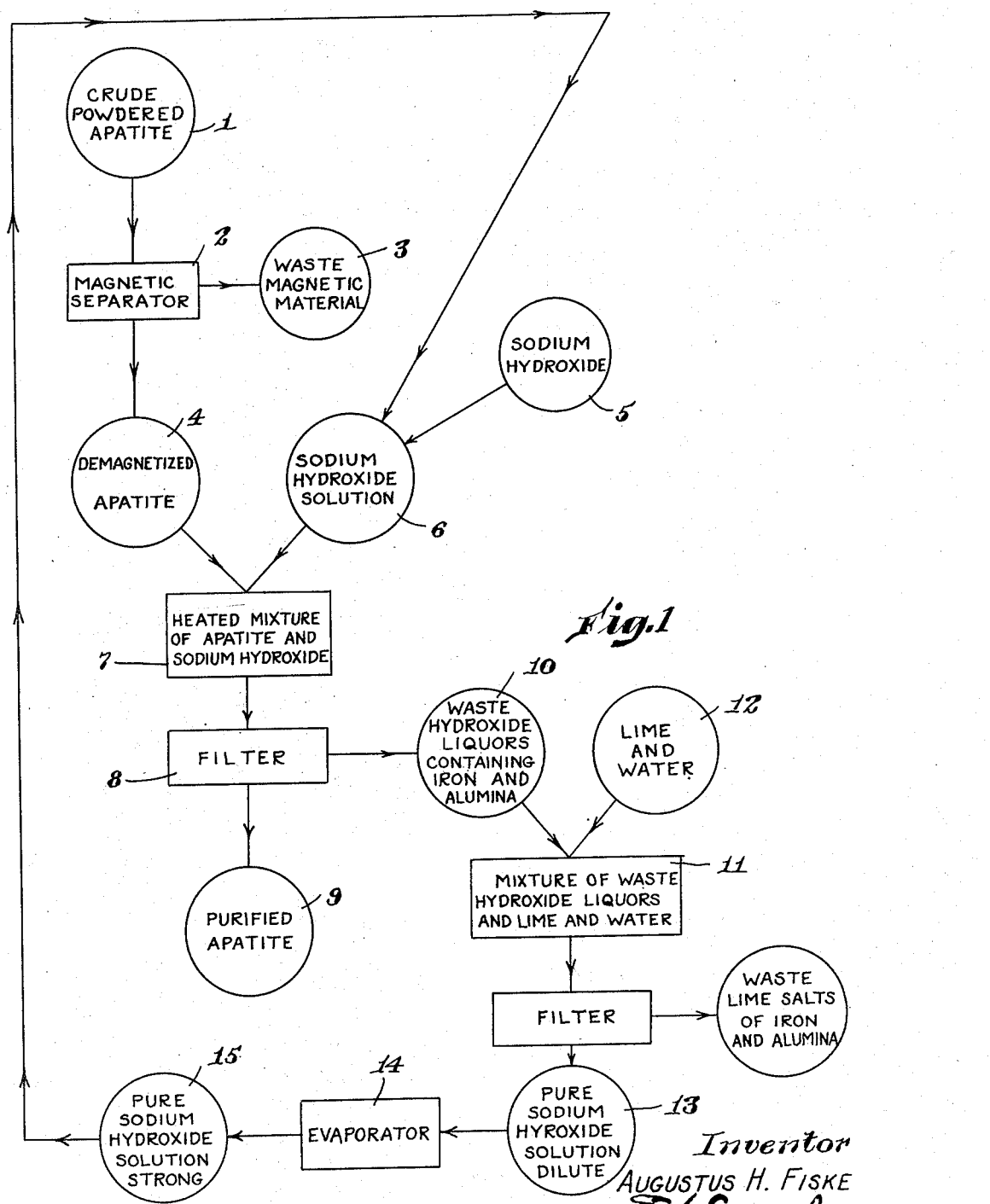

May 11, 1937.  A. H. FISKE  2,079,847
PURIFICATION OF PHOSPHATE SOURCE FOR ACID MANUFACTURE
Filed May 27, 1936   2 Sheets-Sheet 2

Inventor
AUGUSTUS H. FISKE
by Ellis Spear Jr.
Attorney

Patented May 11, 1937

2,079,847

UNITED STATES PATENT OFFICE 2,079,847

PURIFICATION OF PHOSPHATE SOURCE FOR ACID MANUFACTURE

Augustus H. Fiske, Warren, R. I., assignor to Rumford Chemical Works, Rumford, R. I., a corporation of Rhode Island Application May 27, 1936, Serial No. 82,005

8 Claims. (Cl. 23—108)

My present invention relates to certain improvements in the treatment of certain phosphorous sources notably for the manufacture of phosphoric acid and particularly the preparation of a phosphate source for the same.

In the natural sources at present known or workable there have been present various impurities such as metals or metallic salts. Of these notably the iron and alumina have proven troublesome especially in processes utilizing a sulphuric acid treatment as apt to cause objectionable discolorations and other properties in later products, although it is also desirable to remove other metallic impurities such e. g. as chromium, titanium, vanadium and manganese, and non-metallic impurities such as silica, fluorine, chlorine, bromine and iodine as well as arsenic.

My present invention renders available sources that otherwise would not have been considered fit or of low desirability in acid making.

As illustrative of my inventions or discoveries, I will discuss certain natural sources, their impurities and their treatments. Phosphatic sources of the character of apatite which is a crystalline rock, as distinguished from sources of sedimentary character, offer supplies of what is essentially a tricalcium phosphate.

In such a phosphatic source the rock may run the usual ranges of iron and aluminum as the principal impurities, but these usually occur as oxides and I have discovered that when such rock is in a fine or pulverized condition the particles containing the iron and alumina impurities are magnetically susceptible. Thus while the alumina is itself very little affected by a magnetic field, the iron in the apatite which is of the character $Fe_3O_4$ is so much so that it can to a very considerable extent be removed by a simple magnetic separation process, taking with it an equivalent amount of alumina. The oxides of iron and aluminum are probably crystallized together in the same or associated particles and such particle being magnetically affected by its content of iron may carry with it an equivalent amount of aluminum. By my magnetic separation step I actually reduce the oxides of iron and aluminum by about one-fourth. This I note in contrast to other types of phosphate rocks wherein the iron and aluminum impurities are in the form of the phosphate $FePO_4$ and $AlPO_4$, or some derivative of this character which is not particularly magnetic and cannot be separated magnetically in any known manner.

While my concept is capable of practice as a process with any convenient plant equipment, I show as an illustrative contribution to my explanation, a schematic diagram suggestive of a characteristic layout for a plant operated according to my invention.

According to my invention the apparatus by which I separate impurities as magnetic iron and aluminum may be one of well known type. Such magnetic apparatus preferably used are those wherein the finely powdered material is run from a hopper or like supply 1 under a magnetic separator as at 2 being run preferably in a thin film as on a belt or like conveyor. The magnetic particles are attracted out of the film of phosphate dust and carried to one side as at 3 by the separator while the phosphate from which the magnetic material has been removed passes on for use in making phosphoric acid, as to a tank 4.

Instead of using a magnetic separator as above suggested I may effect separation on an electrostatic basis as is commonly practiced in separating the gangue from the valuable mineral in an ore. Physical separation may also be effected on the basis of the greater density of the iron and metallic particles over that of the calcium phosphate particles as on a vibrating table or jig. In the case of very fine powders the particles can be mechanically separated by fractional flotation in air as where the material is blown into a chamber in which the heavier particles fall nearer the point of entry and the lighter particles are carried along a greater distance in the air stream before being dropped.

Any such apatite may be reduced to a finely powdered condition if not naturally so occurring. Such a source usually contains approximately 2% of iron and aluminum calculated as oxides, $Fe_2O_3$ and $Al_2O_3$. This mixture in the material usually stands approximately 1% of iron oxide, calculated as $Fe_2O_3$ and 1% of aluminum oxide calculated as $Al_2O_3$.

By passing the material through a magnetic separator as before described, I lower the total iron and aluminum oxide content by the influence of a magnet of a separator as at 4 to approximately 1½% in which I find that the relationship of the iron and the aluminum have not changed very greatly. Such a pulverized apatite subjected to such magnetic separation constitutes according to my invention a novel phosphate source which may contain as low, as for example, three-quarters of a percent of iron and three-quarters of a percent of aluminum, calculated as equivalent oxides, $Fe_2O_3$ and $Al_2O_3$, the combined iron and aluminum impurities being reduced from 2% to 1½% of the apatite.

After I have freed such an apatite source from a portion of its iron and alumina impurities as by my magnetic process, I next treat the material with a solvent. For this I use preferably a solution of caustic soda, otherwise known as sodium hydroxide (NaOH). Sodium hydroxide may be supplied as from 5 to a solution tank as at 6. I have demonstrated that the oxide of iron and oxide of alumina remaining after the magnetic separation process, can be thus dissolved out of the phosphate material. In this connection it should be borne in mind that the apatite with which I work is essentially a tri-calcium phosphate which is insoluble in sodium hydroxide or its equivalent alkalis as distinguished from the aluminum phosphates which do dissolve in NaOH as indicated in the prior art, such dissolving of the aluminum phosphate being one step in the common methods of separating the aluminum and phosphate so that both might be later utilized as purified aluminum and phosphate. In the apatite phosphate the aluminum is present only in such small amount as to have no commercial value and is removed wholly as an undesired impurity from the phosphate. Dissolving out of the iron and alumina impurity from an apatite by an alkaline reagent is I believe a new idea for the purification of a crude phosphate source of phosphatic material. The sedimentary variety of mineral phosphate used as raw material in the industry contains as much or more iron and alumina impurity as the apatite variety but in the sedimentary variety of phosphate rock the iron and alumina impurity is insoluble in the sodium hydroxide solution so that no separation of it as an impurity from phosphate can be attained by such a treatment. On the basis of present known chemical facts certain forms of oxides of iron are soluble in caustic soda and certain forms of oxides of alumina are also soluble in caustic soda solutions. Attributive to my concept is the fact that tricalcium phosphate, of which such apatite sources are crystalline forms, is insoluble in caustic soda solutions.

In practice, for example, by digesting as at 7 a finely powdered magnetically treated apatite source of the type indicated for two hours in a concentrated caustic soda solution in which the solution is fifty parts by weight of caustic soda to one hundred parts by weight of water at the boiling point of the solution or in a steam autoclave under 50 pounds to 80 pounds steam pressure, at a temperature of 280° to 300° F., a successful purification can be carried out on a commercial scale.

By using a slightly less concentrated solution and by heating for a longer period of time, approximately the same successful removal of the iron and aluminum oxides from such an apatite source can be obtained.

By raising the temperature under the influence of steam pressure or super-heated steam in an autoclave or steam digester, the time element can be shortened. There are, therefore, three related variants in my process: (1) the concentration of the caustic soda solution; (2) the temperature of digestion; and (3) the length of time of digestion.

By increasing the time I can use a decreased concentration or by keeping the concentration the same I can utilize my process at a lower temperature but at an increase in time.

These factors are capable of being made according to my concept inter-dependent for ultimate purposes. To obtain a maximum of purification of such an apatite source I utilize the effects of the three factors on each other as follows: (1) increase the concentration and decrease the time necessary to do the work; (2) increase the temperature and decrease the time or (3), keeping the time the same, decrease the concentration.

While I do not wish to confine myself to any particular percentage of caustic soda, my experience indicates that it would not be very practical to use a weaker solution than about a 10% solution on account of the long time that it would take to extract a satisfactory amount of the iron and aluminum from the apatite source. Also, any solution of higher strength than 50 parts by weight of caustic soda to 100 parts by weight of water would answer my purpose for the extraction of the iron and aluminum in my process. The limit is the limit of fluidity of the mass of caustic soda and source, but I have found that the fusion of the caustic soda with the apatite with practically no water present is satisfactory in the removal of the iron and the aluminum from the apatite. Dry fused caustic soda is the most concentrated form used in practice.

In practice the muddy solution obtained from such a process is diluted and washed on a filter as at 8 with water until all the caustic element has been removed. The product collected as at 9 will then be found to contain not over one-quarter to one-half of a percent each of iron and aluminum calculated as oxides and as such may be used advantageously in the manufacture of pure phosphoric acid.

Without submitting to limitation by theory, it is probable that the aluminum is removed from the apatite source by dissolving in the caustic soda, forming sodium aluminate approximately as of the chemical formula $Na_3AlO_3$, and that the iron is removed in the form of a ferrite of soda which probably is derived from the material known as ferric acid, as of the formula $H_2FeO_4$, and therefore with limitation, I predicated that the sodium salt which I obtain in my process is probably $Na_2FeO_4$. Both the sodium aluminate and sodium ferrite are soluble in the solutions above suggested for use.

In calculating the amount of reactant as of caustic soda to use it is only necessary to calculate the caustic soda in theoretical proportions for the amounts of iron and aluminum oxides contained in the apatite source, additional allowance being made for operating conditions.

It is indicated that in the practice of my process an excess of caustic soda is desirable to keep the concentration at a sufficiently high level to dissolve the iron and alumina while it is consumed in this process. As stated above, the concentration element is dependent on the time element and the temperature element. Therefore I contemplate a sufficient excess of caustic soda so that as the process proceeds, the consumption of caustic soda in the process will not be reduced below the minimum required for the time and temperature factors used, to prevent the process from being efficient and practical from a manufacturing point of view.

The excess of caustic soda also keeps the sodium ferrite in a soluble condition and prevents it from becoming insoluble. In this way I maintain concentrations of the solutions at all times during the process of the reaction at the most efficient stage. This excess is adjusted by the operation of my process but I may also maintain in my process a state of high efficiency by adjusting the circulation obtained in the cooking kettle, or autoclave, and on other mechanical factors which may vary with the design of the apparatus in which to carry on the process on a manufacturing scale.

If it be desired to test on a laboratory scale, it is sufficient to use enough solution to cover the magnetically separated apatite source and to render it fluid so that a stirring or agitation of the material will give an opportunity for the solvent action of the hot caustic soda to take place. This same principle, in addition to the other considerations mentioned above, must also apply in judging the proper amount of excess of caustic soda to use in my process.

Although I have referred herein to caustic soda or sodium hydroxide as the alkaline re-agent other alkaline re-agents as, for example, potassium hydroxide can be used. While under present economical conditions potassium hydroxide is not desirable on account of its cost, there are certain advantages in its use. If desired a mixture of sodium hydroxide and aluminum hydroxide may be used and this will give a still lower fusing point.

The hydroxides are both freely soluble in water, the potassium being even more soluble than the sodium hydroxide. In the same manner, the potassium aluminate and the potassium ferrite are of greater solubility in water than the sodium aluminate and the sodium ferrite. Potassium salts and sodium salts belong to the same chemical group of elements and their salts resemble each other to a very large extent. Since these hydroxides are so similar in their characteristics they may be used separately or together in admixture in my process. If my process is to be used with a very high concentration of hydroxide of sodium or potassium hydroxide, or even on a basis of fusion, it may be found advantageous to use a mixture of the two hydroxides, potassium hydroxide and sodium hydroxide, as mixtures of inorganic substances melt at a lower temperature than either of the components.

In such a mixture I find that quite a large excess of the caustic alkali, as sodium hydroxide, should be used to make the sodium ferrite soluble and that the solution should be separated as soon as possible because on standing the ferrite tends to decompose and precipitate in the form of an insoluble ferric compound which will naturally return the iron to the apatite rock if it is not removed in solution before the decomposition takes place. I have found that if I allow the solution to stand over night in contact with the material after it has been treated according to the process, or if I allow it to cool for a number of hours, that a brown precipitation of a ferric compound is formed and becomes mixed or otherwise united with the apatite. It is, therefore, recommended to filter immediately and while hot.

When considered as a part of a phosphoric acid system, the fact that caustic soda is expensive will militate against the practicability of my process from an economic point of view unless provision is made for its recovery and re-use.

Carrying my concept further I provide in addition to the purification of the prepared apatite source by the caustic soda, an included interreactive process in the chemical procedure to regenerate the caustic soda so that it can be used once more for the purposes of the process.

Such a process may be briefly indicated as follows, reference being had to the accompanying diagram of the drawings. After the spent caustic soda solution containing the iron and aluminum salts has been separated from the purified apatite source as by filtration or sedimentation as at the filter 8, the waste liquors are collected as at 10. These liquors collected at 10 contain in solution sodium aluminate, sodium ferrite and caustic soda. I then treat this solution as at 11 with a suspension of lime in water (milk of lime) which may be added as from a supply 12.

The amount of lime should be calculated on the basis of the chemical equivalent of the sodium aluminate and sodium ferrite in accordance with reactions given below, an allowance of excess lime being made of sufficient amount to cause completion of the reactions. The milk of lime should be mixed with the caustic soda solution containing the sodium aluminate and sodium ferrite above described.

It will be found that the lime will react with the sodium aluminate forming calcium aluminate and regenerated sodium hydroxide. In the same way it reacts with the sodium ferrite causing a precipitation of calcium ferrite and the regeneration of caustic soda. Any excess of lime will be insoluble along with the calcium aluminate and the calcium ferrite, both of which are insoluble in the solution in which they have been formed.

From this I obtain a clear solution as at 13 after settling or filtration of sodium hydroxide which may be concentrated as at 14 to the correct strength for use in purifying more of the phosphatic source.

The reactions involved in this treatment may be indicated as follows:

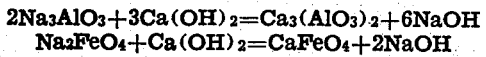

$$2Na_3AlO_3 + 3Ca(OH)_2 = Ca_3(AlO_3)_2 + 6NaOH$$
$$Na_2FeO_4 + Ca(OH)_2 = CaFeO_4 + 2NaOH$$

The formula for the milk of lime being taken as $Ca(OH)_2$.

By the above regeneration process for the caustic soda it will be seen that the consumption of caustic soda is really reduced to a consumption of lime which is one of the cheapest forms of caustic alkali obtainable. The only loss of caustic soda may be due to operating losses and not due to consumption of caustic soda in the process itself.

I have included my step of regeneration of the caustic soda as an important part of my purification process because commercially the purification of the apatite would not be practicable without some method of regeneration or recapture and use over again of the sodium hydroxide. The waste or throwing away of the sodium hydroxide from each purification batch would be so expensive as to make such process generally economically inadvisable to attempt. My regeneration of the sodium hydroxide is a simple and inexpensive step and its use places my process on a sound economic basis.

In comparison with any process for dissolving out the iron and aluminum as by means of an acid, such a process dissolves at the same time a certain amount of phosphate which is a loss, and has to be taken into consideration in operating the process as an operating loss. In my caustic process the calcium phosphate is absolutely insoluble in the caustic soda and there is no operating loss of phosphate of any kind. This is important as up to 10% of the total phosphate in the rock may be lost by means of any acid process.

While I have discussed the magnetic separation phase of my invention particularly with respect to the removal of such metallic impurities as iron and aluminum, this metallic separation also removes non-metallic impurities if they are clinging to the metallic or magnetic particles. It will be understood that silica or silicates or arsenic, none of which may be classed as metals, may be removed with the magnetic influence if they are in a granule or particle which contains sufficient magnetic material to be affected by the magnetic influence. Such metallic impurities as vanadium, titanium, and chromium compounds may also be combined with the iron and aluminum. It is well known in mineralogy that these elements are often found in crystalline rocks in small amounts along with magnetic oxide of iron and other crystalline or porphyritic minerals or rocks. As their salts are colored they have a tendency to discolor the finished product and so are very undesirable. Manganese is another impurity which will be removed with a magnetic particle.

The chemical purification phase removes other undesirable impurities, both metallic and non-metallic, in addition to the iron and aluminum. For example, the caustic soda will remove such non-metallic impurities as silica, fluorine, chlorine, bromine, and iodine. It is well known that all phosphates contain 1% or 2% of fluorine and that certain phosphates contain a considerable amount of iodine. Still other phosphates have been known to contain small traces of chlorine. My chemical purification by an alkaline reagent such as caustic soda will I believe remove all the halogens.

Summarizing, among the impurities to be removed under the metallic category are included iron, aluminum, chromium, titanium, vanadium, and manganese, while in the non-metallic category will be included silica, fluorine, chlorine, bromine, and iodine, classed as the halogens, and arsenic.

The combination of the physical reduction, as by magnetic separation of the metallic impurities and combined metallic and non-metallic impurities, with the chemical reduction, as by dissolving of the remaining impurities with caustic soda, presents a very complete and satisfactory method of purification of the phosphate material. The magnetic separation step is cheap and economical and does not require any expensive chemicals. The chemical reduction alone requires an expensive chemical, for example, caustic soda. By the use of the magnetic separator, it is possible to economize to the extent of the chemicals which would be consumed by the material removed by the magnetic separator. In this way the magnetic separator effects economy in the use of caustic soda. By reclaiming and rinsing the used caustic soda a still greater saving is effected.

Instead of filtering the solution as suggested above, it may be separated by centrifuging or by sedimentation and washings.

Figure 2:
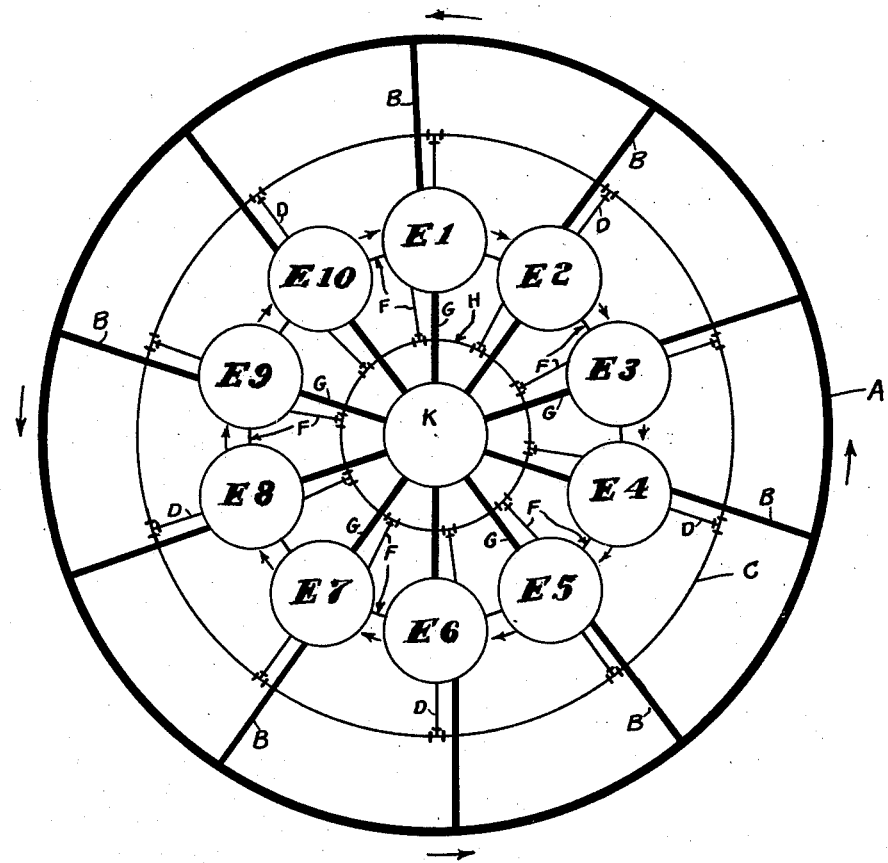

As indicated in the accompanying flow sheet, Fig. 2 of the drawings, I may provide in place of the simple tank 7 of Fig. 1, a series of receptacles indicated therein as E1 to E10, inclusive. Into these the phosphate rock is introduced as separate batches or changes, as from a circular conveyor A onto which the mechanically purified apatite may be fed as from 4 (Fig. 1).

From the circular conveyor A radial feeders B, B, etc. supply the apatite to the tanks E1 to E10, inclusive, as needed. The hot caustic liquor may be piped from a circular supply (as from 5 in Fig. 1) radially to the tanks E, E, etc. in which the apatite is treated. The caustic may be circulated from tank to tank through the series by connecting pipes F, F, etc. as described.

The purified apatite when the series is finished may be collected by conveyors G, G, etc. to a storage K (Fig. 2) corresponding to the indicated receptacle 9, of Fig. 1.

The hot caustic waste liquors may be drained from the tanks as by a pipe line H corresponding to the indicated tank 10 in Fig. 1.

While the plan or chart of Fig. 2 is indicated for the sake of simplicity as a plan, it will be understood that in a plant arrangement the indicated parts would have their own convenient levels.

The caustic soda is thus fed on the countercurrent principle so that, for example, the tank E1 is treated with fresh caustic which is then subsequently used successively in tanks E2, E3, and so on through the series, after which the caustic will be found rather heavily saturated with the impurities from the apatite.

The caustic charge in tank E1 may be considered as the final or finished charge of the series the phosphates having been already successively treated in all of the other tanks and having had almost all of its impurities removed. It therefore is treated last with the freshest caustic soda solution in contrast with the incoming phosphate charge which would be E10 of the series which comes in contact first with the weakest caustic. Such a progression provides an advantageous process as no intermediate filtrations are needed and separation may be effected as before suggested by sedimentation. In this there is less dilution of the caustic solution due to wash waters as there is only one washing operation at the end of the series, and the caustic may be reclaimed from this wash water as heretofore suggested.

The flow of the caustic is indicated by arrows indicating its piping from tank to tank and the apatite entering the series from the conveyor A undergoes a relative counter progression.

My process may be carried on effectively in simple installations which are very economical to operate and make possible the processing of raw material for manufacturing pure phosphoric acid more successfully than any ordinary processes of which I am aware for this purpose, particularly where a sulphuric acid process is used for preparing a product such as phosphoric acid.

The number of tanks such as E may be varied, that shown being purely illustrative. In practice the number of tanks or treatment steps in such a process depends upon the solubility of the impurity in the phosphate rock used. On its degree of solubility or resistance to solvent action depends the number of applications of the solvent necessary to reduce the impurity to the desired point and they will be of such number as is required for the particular rock or the plant requirement as to purity of product.

Purified phosphate materials may be produced from my purification process and used in the manufacture of phosphoric acid by the sulphuric acid method to produce a purer phosphoric acid than commercially produced phosphoric acid products made by any sulphuric acid method heretofore known.

What I therefore claim and desire to secure by Letters Patent is:—

1. The method of removing metallic and non-metallic impurities from a natural calcium phosphate source consisting first in physically separating from the dry powdered non-magnetic phosphate material by magnetic separation those particles including magnetic and combinations of magnetic and non-magnetic impurities, in then dissolving the remaining impurities with an alkali metal hydroxide and in filtering the insoluble phosphates from the solution.

2. The process of purifying natural calcium phosphate material consisting in subjecting the material in powdered form to a magnetic influence to separate the magnetic particles and particles including combinations of magnetic and non-magnetic impurities therefrom, and in then reducing the remaining impurities by dissolving the same with potassium hydroxide, and in separating the insoluble purified phosphates from the solution.

3. The process of purifying natural calcium phosphate material consisting first in subjecting the material in powdered form to a magnetic influence to separate the magnetic particles and particles including combinations of magnetic and non-magnetic impurities therefrom, and in then reducing the remaining impurities by dissolving the same with a mixture of sodium hydroxide and potassium hydroxide, and in immediately separating the insoluble purified phosphates from the solution.

4. The method of removing impurities from a natural calcium phosphate source consisting first in subjecting the powdered material to a magnetic influence to separate therefrom the magnetic particles and particles containing in combination with the magnetic material impurities of a non-magnetic nature, in then reducing the remaining impurities by dissolving the same with caustic soda, in separating the soluble phosphates from the solution, in treating the separated solution with a calcium reactant to effect a precipitation of the metals from the caustic solution, in adding thereto a small amount of fresh caustic soda to render it continuously available in whole or in part as a reactant in the conversion of the impurities aforesaid into soluble salts in the continuous process.

5. In a process of preparing from a natural calcium phosphate source containing metallic impurities, phosphoric acid by sulphuric acid treatment those steps consisting in powdering the phosphate in subjecting the powdered phosphate to magnetic separation to reduce its metal content, in dissolving the remaining impurities with sodium hydroxide, in separating the insoluble phosphates from the solution, and in treating the separated solution with a calcium reactant to effect a precipitation of the metals from the sodium hydroxide solution and in utilizing the reclaimed sodium hydroxide as the solvent of the metallic content aforesaid.

6. The process of purifying natural calcium phosphate material consisting in subjecting the material in powdered form to a magnetic influence to separate therefrom the magnetic particles and particles including combinations of magnetic and non-magnetic impurities, and in then reducing the remaining impurities by dissolving the same with sodium hydroxide and in separating the insoluble purified phosphates from the solution.

7. In a process of preparing from a natural phosphatic source containing metallic impurities, phosphoric acid by sulphuric acid treatment, those steps consisting in powdering the phosphate, in subjecting the powdered phosphate to magnetic separation to reduce its metal content, in dissolving the remaining impurities with an alkali metal hydroxide, in separting the insoluble phosphates from the solution, and in treating the separated solution with a calcium reactant to effect a precipitation of the metals from the sodium hydroxide solution.

8. In a process of preparing from a natural phosphatic source containing metallic impurities, phosphoric acid by sulphuric acid treatment, those steps consisting in powdering the phosphate, in subjecting the powdered phosphate to magnetic separation to reduce its metal content, in dissolving the remaining impurities with an alkali metal hydroxide, in separating the insoluble phosphates from the solution, in treating the separated solution with a calcium reactant to effect a precipitation of the metals from the sodium hydroxide solution, and in utilizing the reclaimed sodium hydroxide as the solvent of the metallic content aforesaid.

AUGUSTUS H. FISKE.